United States Patent Office 3,427,191
Patented Feb. 11, 1969

3,427,191
MAGNETIC RECORDING TAPE

Samuel G. Howell and Dale M. Akers, Cincinnati, Ohio, assignors to National Distillers and Chemical Corporation, New York, N.Y., a corporation of Virginia No Drawing. Filed Mar. 3, 1965, Ser. No. 436,924
U.S. Cl. 117—138.8 4 Claims
Int. Cl. G11b 5/70

ABSTRACT OF THE DISCLOSURE

A magnetic recording tape comprising a biaxially oriented polypropylene base film having a surface coated with an adherent coating formed from a composition comprising finely divided magnetic material, a film forming binder, a solvent for the film forming binder and finely divided polyethylene having an average particle size of less than about 20 microns.

This invention relates to a novel magnetic recording tape. More particularly, the invention pertains to a magnetic recording tape or sheet utilizing a polyolefin film base.

In the early development of magnetic recording tapes it was found that commercially acceptable products could be obtained by applying a finely divided magnetic material, such as iron oxide, in the form of a coating composition to thin plastic tapes or sheets. The most widely used magnetic material was finely divided ferric oxide, $F_2O_3$, which was generally applied as a lacquer comprising cellulose nitrate, polyvinyl chloride, or similar film-forming resins containing suitable solvents, plasticizers, and other modifiers. At the outset, the base film to which the ferric oxide-lacquer composition was applied was mainly cellulose acetate. However, the cellulose acetate based tapes were generally limited to a minimum thickness of 1 mil because of the inherently low tensile strength of the base film. In view of this particular disadvantage, oriented polyester films, and generally oriented polyethylene terephthalate films, have been substituted for the cellulose acetate base films during recent years. Not only do the polyester base films have a much higher tensile strength than the cellulose acetate base films, but they are less affected by humidity conditions. The greater strength of the oriented polyester base films also permitted the storage of a larger amount of the magnetic recording tape on a roll than possible theretofore. Polyester base films, on the other hand, have the disadvantage of being rather costly to produce.

One object of the present invention is to provide a novel magnetic recording tape which avoids the use and production disadvantages of the prior art magnetic recording tapes and sheets.

A further object of the present invention is to provide a novel magnetic recording tape or sheet which utilizes a polyolefin base film in place of the cellulose acetate and polyester base films previously employed in this field.

A still further object of this invention is to provide a novel magnetic recording tape or sheet which utilizes a polypropylene base film.

Another object of the present invention is to provide an improved finely divided magnetic material-lacquer composition which will adhere to a polyolefin film in the production of magnetic recording tapes and sheets.

These and other objects of the present invention will become readily apparent from the ensuing description and illustrative embodiment.

In accordance with the present invention, it has now been found that magnetic recording tapes or sheets can be effectively prepared with a polyolefin film as the base. Although the present invention encompasses the use of a variety of polyethylene and polypropylene base film, the use of polypropylene and particularly biaxially oriented polypropylene is especially preferred. It is contemplated, however, that the base film can be prepared from various monoolefinic hydrocarbons, such as those having from 2 to 4 carbon atoms, as well as various copolymers thereof. The use of polyolefinic film as the base for magnetic recording tapes and sheets is not easily accomplished, since the nature of the polyolefin films has made it extremely difficult to obtain adherent coatings. As is well known, ordinary paints and lacquers cannot be permanently applied to polyolefin films. It was found, moreover, that the ferric oxide-lacquer coatings, for example, were also subject to this lack of adhesion. In accordance with a critical feature of this invention, it was found that the lack of adhesion could be readily overcome by incorporating a minor amount of a finely divided polyolefin in the coating composition prior to its application to the base film. The preferred polyolefinic powders are polyethylene and copolymers thereof such as the copolymer prepared from ethylene and vinyl acetate. Polypropylene, on the other hand, was found to be inapplicable, possibly because of its higher melting point. In general, the finely divided polyolefin will have an average particle size of less than about 20 microns, and preferably an average particle size within the range of about 5 to 15 microns. The use of finely divided polyethylene is preferred for this purpose; and the use of low density polyethylene having a density within the range of about 0.910 to 0.925 g./cu. cm. and a melt index within the range of about 15 to 33 is especially preferred. The exact method of preparing either the polyolefin base film or the finely divided polyethylene or copolymers thereof do not constitute features of the present invention, and it will be understood that conventional and well known processes may be employed to prepare both of these materials. For most purposes, the polypropylene base film employed in the practice of this invention will have a thickness within the range of about 0.3 to 1.5 mils, and preferably about 0.5 to 0.7 mil.

As previously discussed, the magnetic coating compositions employed in the prior art in the preparation of magnetic recording tapes and sheets may be employed in the present invention. In general, such coating compositions will comprise the following components:

(1) A finely divided magnetic material
(2) A binder or film-forming substance
(3) Solvents
(4) A plasticizer for the binder, if necessary Each of the foregoing components may comprise conventional and well known materials. In the case of the magnetic materials, which will generally have a particle size within the range of about 0.05 to 0.5 micron, useful materials include:

Ferric oxide
Magnetic metals
Magnetic metal alloys
Magnetic ceramic powders, e.g., barium ferrite, and the like For the purposes of the present invention, the use of finely divided ferric oxide, $Fe_2O_3$, is preferred. The amount of the finely divided magnetic material employed in the coating composition will generally range from about 0.5 to 20%, although it will be understood that the use of such amounts or the use of specific amounts of the other components, as hereinafter described, is also not a critical feature of the present invention. The ferric oxide or other magnetic material may be used in particle shapes that are rod-like or cylindrical.

The binder or film-forming substance may be selected from one or more of the following materials:

Cellulose nitrate
Cellulose acetate-butyrate
Polyvinyl chloride
Vinyl chloride-vinyl acetate copolymers
Phenol formaldehyde resins, and the like The use of cellulose nitrate is especially preferred in the practice of the present invention. In general, the coating composition will contain from about 1 to 5% by weight, and preferably from about 2 to 4% by weight, of the binder or film forming component, based on the total weight of the coating composition.

The solvent component may comprise any of the known organic solvents employed in the formulation of lacquer coating compositions. Illustrative solvents include, for example, one or more of the following:

Butyl alcohol
Cellosolve
Amyl acetate
Butyl cellosolve
Methyl ethyl ketone
Methyl isobutyl ketone
Cyclohexanone
Toluene, and the like The use of a mixture of two or more of the various solvents listed above is preferred in order to obtain proper viscosity, drying rates, and other handling characteristics. The solvent mixture will comprise the major component of the coating composition and, in general, will range from about 60 to 90%, preferably from about 65 to 85%, by weight of the coating composition.

Since certain binders or film-formers, such as cellulose nitrate, employed in the coating compositions tend to be rather brittle once they set, it is customary to include one or more plasticizers as a component. Again, conventional plasticizers well known to the art can be effectively employed, and such illustrative materials include:

Castor oil
Phthalate esters
Sebacate esters
Adipate esters
Phosphate esters
Epoxides, and the like Only minor amounts, sufficient to achieve the desired plastification, of the plasticizers need be employed. In general, however, that amount of plasticizer may range from about 0.2 to 1.2% by weight, and preferably from about 0.3 to 0.8% by weight.

Although the foregoing are the major components of most of the magnetic coating compositions which have heretofore been employed in the prior art, it is also possible to employ minor amounts of other additives. Thus, for example, some magnetic coating compositions have also contained a minor amount of a natural or synthetic rubber such as styrene-butadiene rubber.

As also set forth above, one of the most essential features of the present invention is the addition of minor amounts of finely divided polyolefins, and especially polyethylene, to the foregoing magnetic coating compositions. For purposes of convenience the invention will be hereinafter described and illustrated in conjunction with the use of the preferred finely divided polyolefin, polyethylene. In general, the mount of the finely divided polyethylene employed may vary from about 10 to 30 parts, preferably from about 15 to 25 parts, per 100 parts of the coating composition. On a weight percentage basis, the broad range is from about 8 to 25%, while the preferred range is from about 12 to 21%. If necessary, various changes may be made in the solvent balance to attain the desired coating viscosity. It will be further understood that the finely divided polyethylene may be either added during the formulation of the coating composition or after it has been previously prepared. The latter procedure permits the use of commercially available magnetic coating compositions.

Conventional coating techniques may be employed in applying the coating compositions of this invention to the polyolefin film base. Such techniques include dip coating, roll coating, brush coating, spray coating, silk screen coating, gravure coating, air knife coating, and the like. Standard commercial equipment may also be employed to effect the coating operation. The resulting wet coated polyolefin base film is then subjected to the usual treatments for the preparation of magnetic recording tapes and sheets. More specifically, the wet coated polyolefin base film is exposed to a strong magnetic field to align the magnetic particles as is normally done with ordinary magnetic coating compositions. A drain step is next employed to remove the solvents and other volatile components as well as to fuse the coating to the polyolefin base film. When oriented polyolefin film, and especially biaxially oriented polypropylene film, is employed as the base film it may be necessary to clamp or otherwise restrain the wet coated film during the drying step to any shrinkage or other distortions as a result of the elastic memory phenomenon. If desired, the cooled magnetic recording tape or sheet thus produced may be buffed to obtain surface smoothness prior to use in a recording machine. It is also possible to employ a top coating such as cellulose nitrate or other compatible lacquer coatings to obtain the desired smoothness.

The curing or fusion temperatures employed in the drying step must be maintained above a temperature whereby the finely divided polyethylene particles will melt and adhere to the base polyolefin film. These elevated temperatures may range from about 250° to 325° F., and preferably from about 275° to 300° F.

The invention will be more fully understood from the following illustrative embodiment. It will be further understood that various commercially available recording machines can be provided with the novel magnetic tapes and sheets of this invention. The terms "tape" and "sheet" have been used interchangeably throughout this specification, and for the present purposes the former term is considered to be generic and to encompass magnetic coated recording sheets.

EXAMPLE

A basic magnetic coating composition was prepared having the following formulation:

| | Percent by weight |
|---|---|
| Ferric oxide, $Fe_2O_3$ | 14.0 |
| Butyl alcohol | 1.2 |
| Cellulose nitrate | 2.8 |
| Cellosolve | 8.0 |
| Amyl acetate | 64.0 |
| Butyl Cellosolve | 9.5 |
| Castor oil | 0.5 |

To 100 parts of the basic coating composition was added 20 parts of a polyethylene powder having an average particle size of about 10 microns, a melt index of 22, and a density of 0.917 gm./cc. After thorough mixing, the resulting magnetic coating composition was applied to a biaxially oriented polypropylene base film by means of a wire wound coating rod to provide a coating, which when dried was about 0.4 to 0.5 mil in thickness. The wet coated polypropylene base film was then exposed to a strong magnetic field and then heated to an elevated temperature of about 300° F. while being restrained to prevent shrinkage which might have occurred from disorientation. The dried, coated polypropylene film was cooled to room temperature and buffed to obtain a smooth surface.

A magnetic recording sheet having 8¼ by 11½ inches was made from the dried coated polypropylene base film described above. The recording sheet was tested in a Vanguard office dictating machine manufactured by Buhrle & Company of Switzerland. Voice and music recordings were made, erased and recorded again with excellent fidelity results. In addition, no deterioration was observed in the recording sheet with respect to fidelity and quality of the recordings over approximately 20 erasures.

The above data show that the outstanding magnetic recording tapes can be prepared in accordance with the present invention. Moreover, the polypropylene film base recording tapes of this invention have the advantage of being lighter in weight and less expensive than the currently employed polyester base films.

What is claimed is:

1. A magnetic recording tape comprising a biaxially oriented polypropylene base film at least one surface of which is coated with an adherent coating formed from a composition comprising finely divided magnetic material in an amount in the range of from about 0.5 to about 20%, an organic film forming binder selected from the group consisting of cellulose nitrate, cellulose acetate-butyrate, polyvinyl chloride, vinyl chloride-vinyl acetate copolymers, phenol formaldehyde resins and mixtures thereof in an amount in the range of from about 1% to about 5% and at least one organic solvent for said binder in an amount in the range of from about 60% to about 90% and finely divided polyethylene having an average particle size of less than about 20 microns in an amount in the range of from about 8% to about 25%, said percentages being by weight based on the total weight of the coating composition.

2. The magnetic recording tape of claim 1 wherein said finely divided magnetic material is ferric oxide.

3. The magnetic recording tape of claim 1 wherein said organic binder is cellulose nitrate and said composition contains a plasticizer in an amount in the range of from about 0.2% to about 1.2%.

4. The magnetic recording tape of claim 1 wherein said finely divided polyethylene has an average particle size of about 5 to 15 microns.

References Cited

UNITED STATES PATENTS

| | | | |
|---|---|---|---|
| 2,628,172 | 2/1953 | Jenett | 117—103 |
| 2,931,740 | 4/1960 | Riboni | 117—138.8 |
| 2,932,323 | 4/1960 | Aires | 138—137 |
| 3,117,092 | 1/1964 | Parker | 252—62.54 |
| 3,243,376 | 3/1966 | Lovick et al. | 252—62.54 |
| 3,310,421 | 3/1967 | Flowers | 117—76 |

FOREIGN PATENTS

| | | |
|---|---|---|
| 676,761 | 8/1952 | Britain. |
| 731,940 | 6/1955 | Britain. |
| 951,867 | 3/1964 | Britain. |

WILLIAM D. MARTIN, *Primary Examiner.*

B. PIANALTO, *Assistant Examiner.*

U.S. Cl. X.R.

117—121, 166; 252—62.54